US008777757B2

(12) United States Patent
Chudek

(10) Patent No.: US 8,777,757 B2
(45) Date of Patent: Jul. 15, 2014

(54) GAMING MACHINE HAVING ENHANCED EMOTIVE LIGHTING FEATURE

(71) Applicant: WMS Gaming Inc., Waukegan, IL (US)

(72) Inventor: Christopher W. Chudek, Evanston, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/627,560

(22) Filed: Sep. 26, 2012

(65) Prior Publication Data

US 2014/0087887 A1 Mar. 27, 2014

(51) Int. Cl.
*G06F 17/00* (2006.01)

(52) U.S. Cl.
USPC .............. 463/46

(58) Field of Classification Search
USPC .............. 463/16–25, 46
See application file for complete search history.

(56) References Cited

U.S. PATENT DOCUMENTS

| | | | | |
|---|---|---|---|---|
| 2,383,469 | A | 8/1945 | Colbert et al. | 117/54 |
| 3,440,431 | A | 4/1969 | Cicchiello | 250/219 |
| 5,534,940 | A | 7/1996 | Sato et al. | 348/556 |
| 5,916,450 | A | 6/1999 | Muggli et al. | 216/4 |
| 6,564,108 | B1 | 5/2003 | Makar et al. | 700/17 |
| 6,611,297 | B1 | 8/2003 | Akashi et al. | 348/739 |
| 6,656,041 | B1 | 12/2003 | Kaminkow et al. | 463/16 |
| 6,656,048 | B2 | 12/2003 | Olsen | 463/25 |
| 6,695,703 | B1 | 2/2004 | McGahn | 463/46 |
| 6,778,226 | B1 | 8/2004 | Eshelman et al. | 348/836 |
| 6,800,030 | B2 | 10/2004 | Acres | 463/25 |
| 6,945,685 | B1 | 9/2005 | Sokolov et al. | 362/632 |
| 6,976,915 | B2 | 12/2005 | Baker et al. | 463/1 |
| 7,072,849 | B1 | 7/2006 | Filepp et al. | 705/14 |
| 7,324,080 | B1 | 1/2008 | Hu et al. | 345/102 |
| 7,396,282 | B2 | 7/2008 | Gauselmann | 463/46 |
| 7,682,249 | B2 | 3/2010 | Winans et al. | 463/31 |
| 7,811,170 | B2 | 10/2010 | Winans et al. | 463/31 |

(Continued)

FOREIGN PATENT DOCUMENTS

| | | | | |
|---|---|---|---|---|
| JP | 2008-012342 A | 1/2008 | | A63F 7/02 |
| JP | 2008-079781 A | 4/2008 | | A63F 5/04 |

(Continued)

OTHER PUBLICATIONS

PCT International Search Report for International Application No. PCT/US2009/061128 dated Dec. 2, 2009 (2 pages).

(Continued)

*Primary Examiner* — Ronald Laneau
(74) *Attorney, Agent, or Firm* — Nixon Peabody LLP

(57) ABSTRACT

A gaming machine includes a light source concealed within a cabinet frame, a light pipe, and a contoured reflective surface. The light pipe has a distal end adjacent to the light source and a proximal end along the cabinet frame and directly viewable from the player position. The light pipe directs the initial light from the distal end to the proximal end such that (a) some initial light exits the proximal end as direct light viewable from the player position and (b) some initial light exits a pipe section, extending between the distal end and the proximal end, as washed light. The contoured reflective surface is adjacent to the proximal end along the cabinet frame, and is configured to receive the washed light from the pipe section and to reflect at least some of the washed light as indirect light viewable from the player position.

20 Claims, 7 Drawing Sheets

(56) References Cited

U.S. PATENT DOCUMENTS

| | | | | |
|---|---|---|---|---|
| 7,841,947 | B2 | 11/2010 | Gauselmann | 463/46 |
| 7,864,204 | B2 | 1/2011 | Overes | 345/905 |
| 7,894,000 | B2 | 2/2011 | Gutta et al. | 348/603 |
| 8,012,021 | B2 * | 9/2011 | Crowder et al. | 463/34 |
| 8,154,669 | B2 | 4/2012 | Wang et al. | 348/801 |
| 8,177,390 | B2 | 5/2012 | Miskin | 362/234 |
| 8,262,457 | B2 * | 9/2012 | Ansari et al. | 463/20 |
| 8,550,913 | B2 * | 10/2013 | Kelly et al. | 463/34 |
| 2002/0173354 | A1 | 11/2002 | Winans et al. | 463/20 |
| 2003/0002246 | A1 | 1/2003 | Kerr | 361/683 |
| 2003/0043314 | A1 | 3/2003 | Lee et al. | 349/65 |
| 2003/0076281 | A1 | 4/2003 | Morgan et al. | 345/44 |
| 2003/0076670 | A1 | 4/2003 | Siegel et al. | 362/85 |
| 2003/0166417 | A1 | 9/2003 | Moriyama et al. | 463/46 |
| 2003/0195045 | A1 | 10/2003 | Kaminkow et al. | 436/47 |
| 2004/0036622 | A1 | 2/2004 | Dukach et al. | 340/691.6 |
| 2004/0038726 | A1 | 2/2004 | Inoue | 463/20 |
| 2004/0125234 | A1 | 7/2004 | Kim | 348/552 |
| 2004/0136189 | A1 | 7/2004 | Vanderschuit | 362/235 |
| 2004/0181989 | A1 | 9/2004 | Miller | 40/716 |
| 2004/0185938 | A1 | 9/2004 | Moore et al. | 463/46 |
| 2005/0085292 | A1 | 4/2005 | Inamura | 463/25 |
| 2005/0128751 | A1 | 6/2005 | Roberge et al. | 362/276 |
| 2005/0130732 | A1 | 6/2005 | Rothschild et al. | 463/20 |
| 2005/0153780 | A1 | 7/2005 | Gauselmann | 463/47 |
| 2005/0261057 | A1 | 11/2005 | Bleich et al. | 463/30 |
| 2006/0063591 | A1 | 3/2006 | Gauselmann | 463/30 |
| 2007/0021204 | A1 | 1/2007 | Eloff et al. | 463/30 |
| 2007/0041094 | A1 | 2/2007 | Dominguez-Montes | 359/462 |
| 2007/0093290 | A1 | 4/2007 | Winans et al. | 463/30 |
| 2007/0103918 | A1 | 5/2007 | Lin | 362/427 |
| 2007/0164975 | A1 | 7/2007 | Lim et al. | 345/102 |
| 2007/0165406 | A1 | 7/2007 | Wang | 362/253 |
| 2007/0287528 | A1 | 12/2007 | Hirato et al. | 463/20 |
| 2008/0039213 | A1 | 2/2008 | Cornell et al. | 463/46 |
| 2008/0062700 | A1 | 3/2008 | Hayashi et al. | 362/294 |
| 2008/0129662 | A1 | 6/2008 | Yoo et al. | 345/84 |
| 2008/0207303 | A1 | 8/2008 | Rasmussen | 463/20 |
| 2008/0268942 | A1 | 10/2008 | DeRuyter | 463/22 |
| 2009/0045723 | A1 | 2/2009 | Ishikawa | 313/504 |
| 2009/0046455 | A1 | 2/2009 | Yoshino et al. | 362/234 |
| 2009/0149242 | A1 | 6/2009 | Woodard et al. | 463/21 |
| 2009/0174346 | A1 | 7/2009 | Hwang et al. | 315/294 |
| 2010/0053229 | A1 | 3/2010 | Krijn et al. | 345/690 |
| 2010/0097408 | A1 | 4/2010 | Marcellinus et al. | 345/690 |
| 2010/0227667 | A1 | 9/2010 | Englman et al. | 463/20 |
| 2010/0238664 | A1 | 9/2010 | Steenbergen | 362/276 |
| 2011/0201411 | A1 | 8/2011 | Lesley et al. | 463/25 |

FOREIGN PATENT DOCUMENTS

| | | | | |
|---|---|---|---|---|
| JP | 2008-086589 | A | 4/2008 | A63F 7/02 |
| WO | WO 01/34262 | A1 | 5/2001 | A63F 17/32 |
| WO | WO 02/091319 | A2 | 11/2002 | G07F 17/32 |
| WO | WO 2004/075128 | A1 | 9/2004 | G07F 17/32 |
| WO | WO 2004/075129 | A1 | 9/2004 | G07F 17/32 |
| WO | WO 2006/036486 | A1 | 4/2006 | A63F 13/00 |
| WO | WO 2009/061457 | A1 | 5/2009 | G07F 17/32 |

OTHER PUBLICATIONS

PCT International Written Opinion for International Application No. PCT/US2009/061128 dated Dec. 2, 2009 (5 pages).
Third Party Submission in dated Oct. 18, 2011 (3 pages).

* cited by examiner

GAMING MACHINE HAVING ENHANCED EMOTIVE LIGHTING FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to an emotive lighting feature for lighting a gaming machine.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Traditionally, gaming machines operate under control of a processor that has been programmed to execute base games and bonus games in which reel arrays spin and stop to display symbol combinations in a display area. If winning combinations are achieved by the symbol combinations, awards are provided to the players.

SUMMARY OF THE INVENTION

According to one aspect of the present invention, a gaming machine has a cabinet including a cabinet frame facing a player position in front of the gaming machine. One or more display devices are within the cabinet and are configured to display a wagering game. At least one light source is concealed within the cabinet such that the light source is not viewable from the player position, the light source emitting initial light. At least one light pipe has a proximal end, a distal end, and a pipe section extending therebetween. The distal end is adjacent to the light source, and the proximal end is positioned along the cabinet frame and directly viewable from the player position. The light pipe directs the initial light from the distal end to the proximal end such that (a) some of the initial light exits the proximal end as direct light viewable from the player position and (b) some of the initial light exits the pipe section as washed light. The gaming machine further has at least one contoured reflective surface adjacent to the proximal end along the cabinet frame. The reflective surface is configured to receive the washed light from the pipe section and to reflect at least some of the washed light as indirect light viewable from the player position.

According to another aspect of the invention, a gaming machine has a cabinet frame having at least one exterior edge viewable from and facing a player position in front of the gaming machine. One or more display devices are within the cabinet and are configured to display a wagering game. At least one light source is concealed within the cabinet frame such that the light source is not viewable from the player position, the light source emitting initial light. At least one primary zone of light is positioned proximate and parallel to the exterior edge. The primary zone of light is defined by at least one light pipe having a proximal end, a distal end, and a pipe section extending therebetween. The distal end is adjacent to the light source, and the proximal end is positioned along the exterior edge and is directly viewable from the player position. The light pipe directs the initial light from the distal end to the proximal end such that (a) some of the initial light exits the proximal end as direct light viewable from the player position and (b) some of the initial light exits the pipe section as washed light. At least one secondary zone of light is positioned parallel to and between the primary zone of light and the exterior edge. The secondary zone of light is defined by a contoured reflective surface adjacent to the proximal end of the light pipe. The contoured reflective surface is configured to receive washed light from the pipe section and to reflect at least some of the washed light as indirect light viewable from the player position.

According to yet another aspect of the invention, a gaming system is a cabinet including a band-shaped reflective surface viewable by a player in front of the cabinet. The gaming system further includes a light pipe having a proximal end, the proximal end being parallel and adjacent to the reflective surface and viewable by the player. The light pipe is positioned to receive light from a light source within the cabinet and emit a first portion of the light through a proximal end and a second portion of the light onto the reflective surface.

Additional aspects of the invention will be apparent to those of ordinary skill in the art in view of the detailed description of various embodiments, which is made with reference to the drawings, a brief description of which is provided below.

Figure 1:
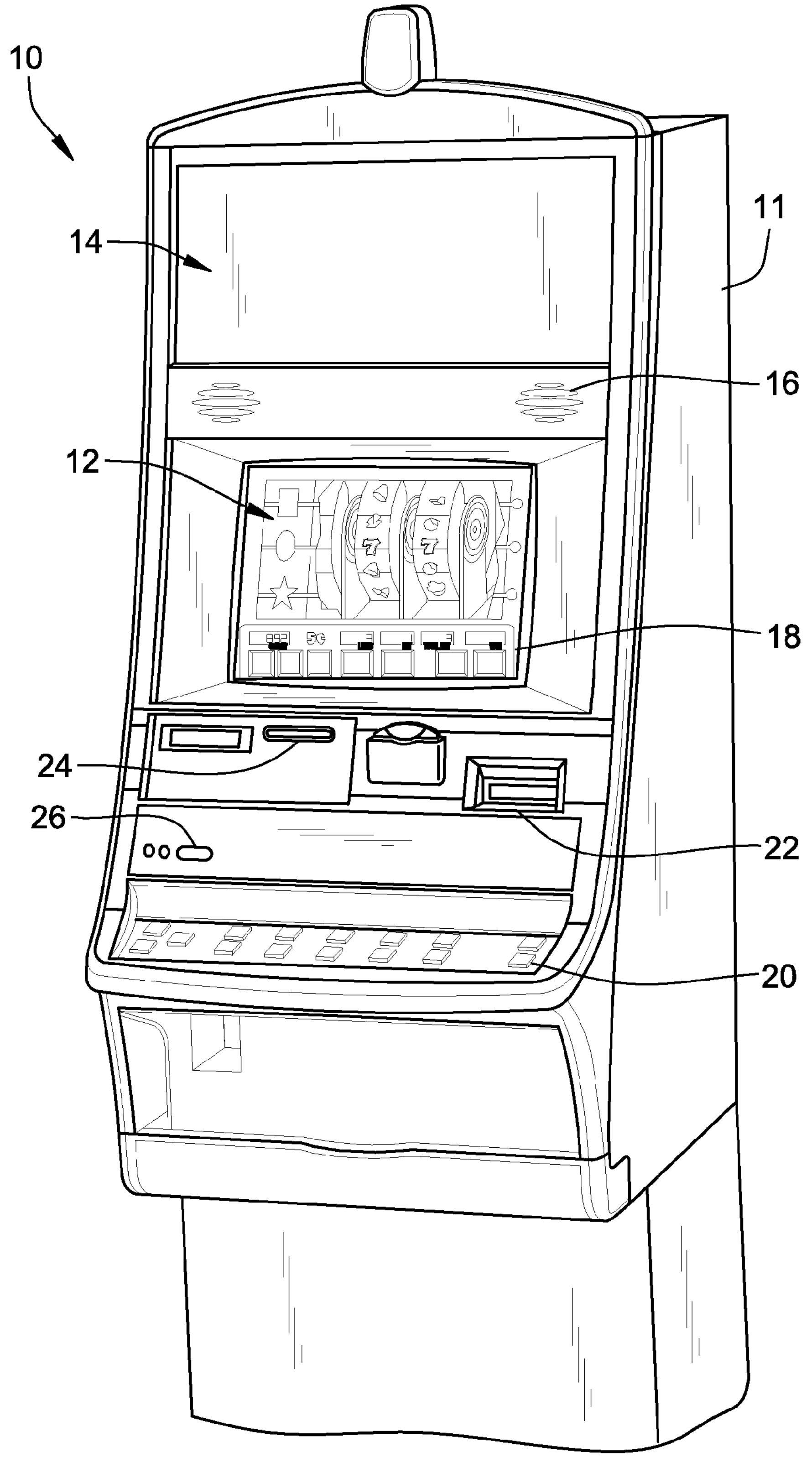
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
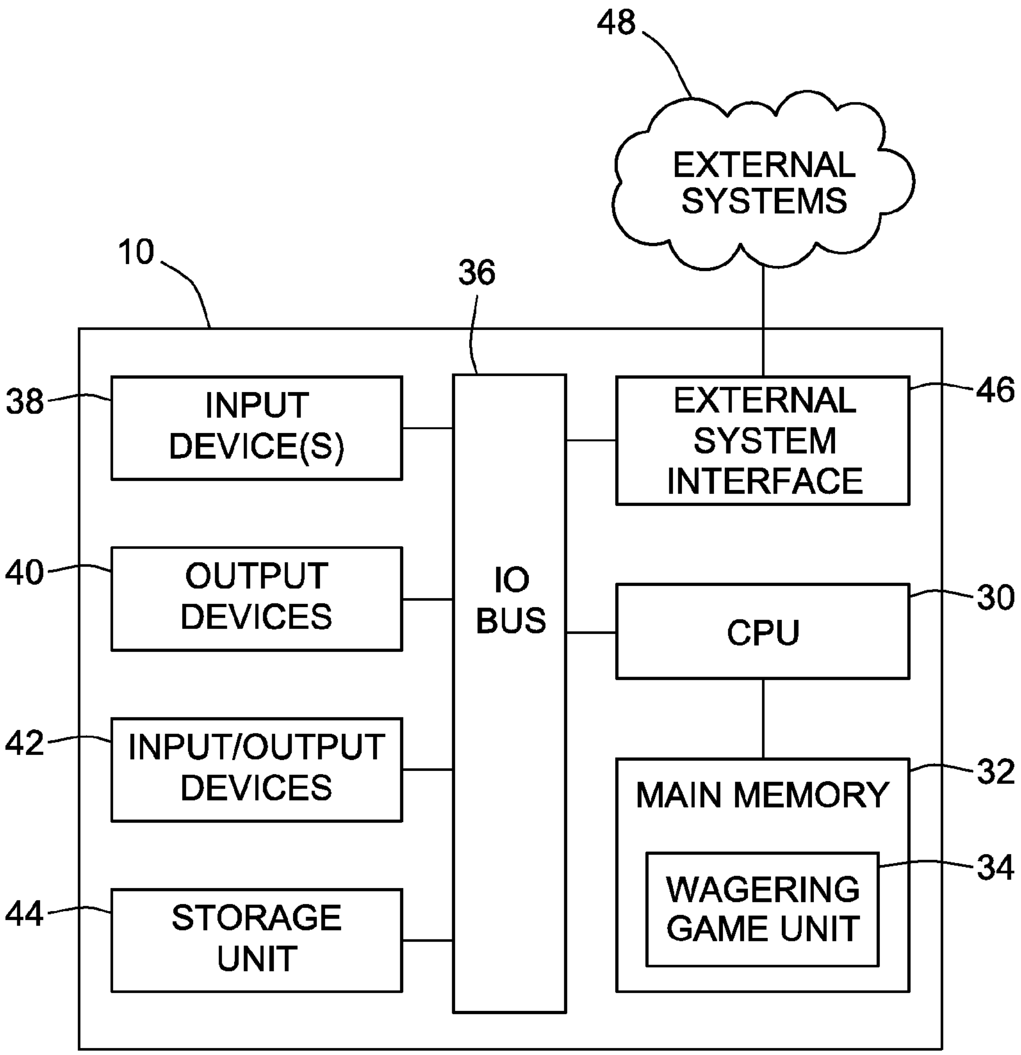
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
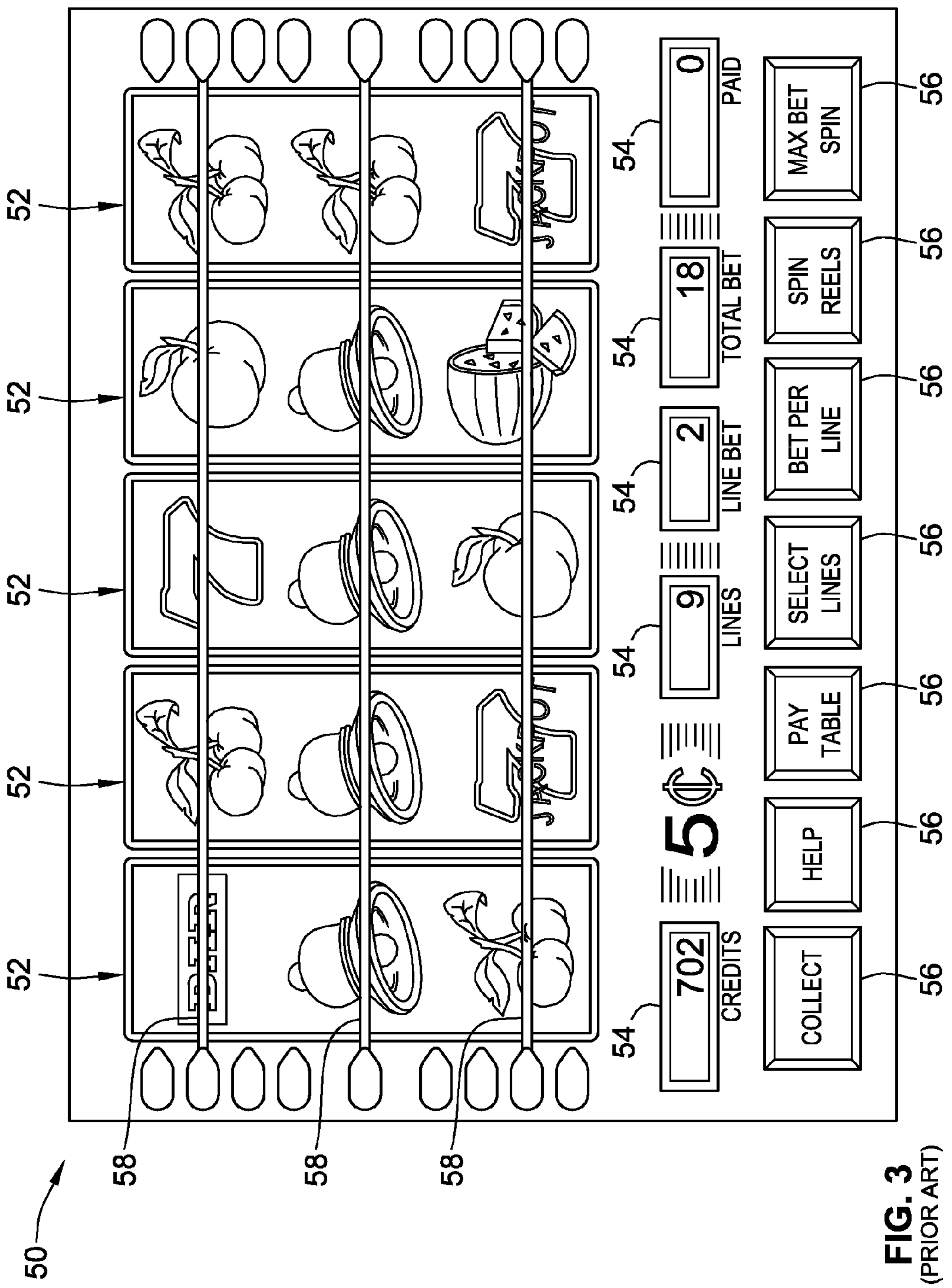
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
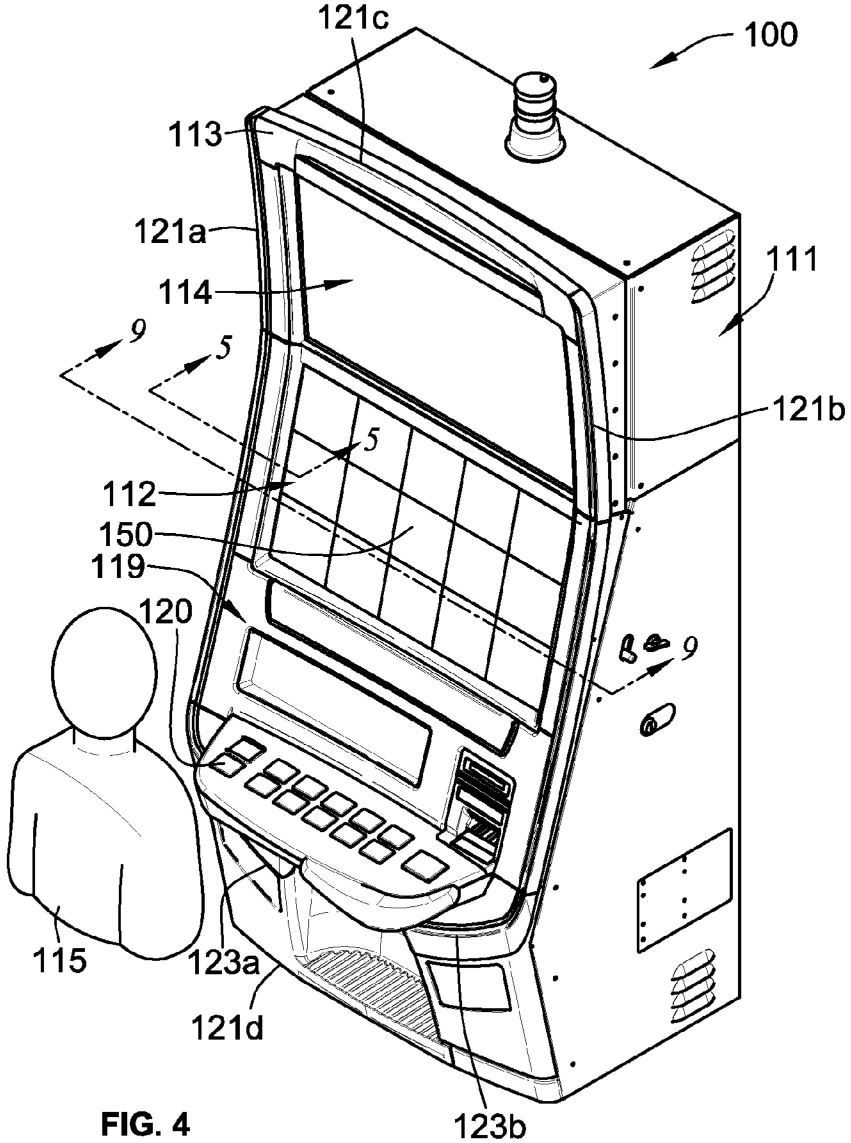
FIG. 4 is a perspective view of a gaming machine with emotive lighting features.

Referring now to FIG. 4, a gaming machine 100 has a cabinet 111 that may house various input devices, output devices, and input/output devices. The gaming machine 100 is similar, but not identical, to the gaming terminal 10 illustrated in FIG. 1. The gaming machine 100 includes a primary display area 112 and a secondary display area 114, each of which being a mechanical-reel display, a video display, or a combination thereof in which a transmissive video display is disposed in front of the mechanical-reel display to portray a video image superimposed upon the mechanical-reel display.

The cabinet 111 has a cabinet frame 113 facing a player position 115 in front of the gaming machine 100. The primary and secondary display areas 112, 114 are positioned within the cabinet frame 113 and are configured to display a wagering game. For example, the primary display area 112 is configured to show a basic-game screen 150 that may be similar to the basic-game screen 50 described in reference to FIG. 3. The secondary display area 114 is configured to show a similar image and/or other images. The primary display area 112 is located below the secondary display area 114 and angled towards the player position 115. The secondary display area 114 is generally positioned in a vertical orientation parallel to the player position 115.

Below the primary display area 112, the gaming machine 100 further includes a player interface area 119 that includes a button panel with buttons 120. Similar to the gaming terminal 10 of FIG. 1, the player interface area 119 may also include a bill validator, one or more information reader/writers, one or more player-accessible ports, etc. In addition to or instead of the player interface area 119, the player can provide inputs via a touch screen mounted over the primary or secondary display areas 112, 114 (similar to touch screen 18). Thus, input devices, such as buttons 120 or other devices, accept and transform player inputs to electronic data signals indicative of the player inputs.

The cabinet frame 113 is defined by a plurality of exterior edges 121, including a left exterior edge 121*a*, a right exterior edge 121*b*, a top exterior edge 121*c*, and a bottom exterior edge 121*d*. Near and below the buttons 120, the left and right exterior edges 121*a*, 121*b* curve inwardly to form front edges 123*a*, 123*b*. The exterior edges 121 are viewable from and facing the player positions 115 in front of the gaming machine 100. Furthermore, the left and right exterior edges 121*a*, 121*b* are viewable from the player position 115 as generally vertical edges, and the top and bottom exterior edges 121*c*, 121*d* are viewable from the player position 115 as generally horizontal edges.

Figure 5:
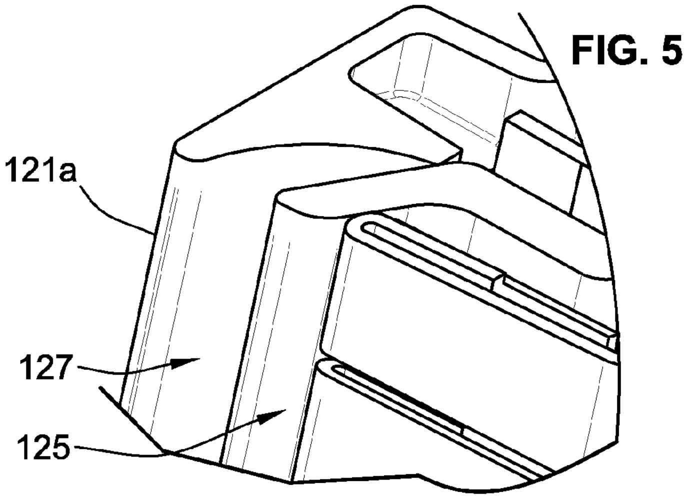
FIG. 5 is an enlarged cross-sectional view illustrating zones of light along plane "5-5" in FIG. 4.

Referring to FIG. 5, the cabinet 111 further includes an emotive lighting feature in the form of a pair of zones of light 125, 127 that are configured proximate and parallel to respective ones of the exterior edges 121*a*, 121*b*. The zones of light includes at least one primary zone of light 125 and at least one secondary zone of light 127, each zone emitting a distinct light for enhancing the visual experience of the player. As discussed in more detail below, each zone of light can provide a brighter or dimmer type of light.

Figure 7:
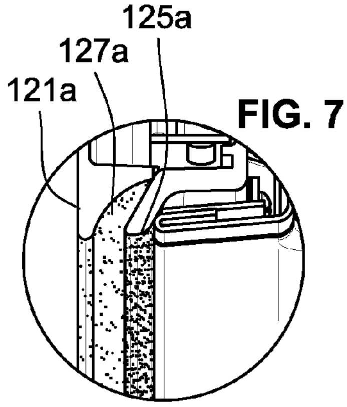
FIG. 7 is an enlarged cross-sectional front-top view illustrating left zones of light along plane "7-7" in FIG. 6.
Figure 8:
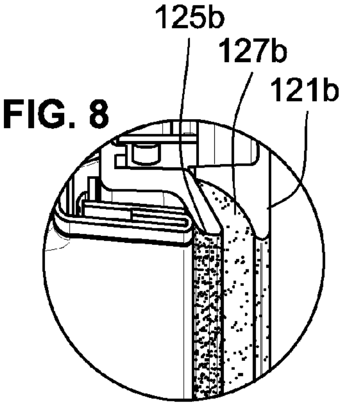
FIG. 8 is an enlarged cross-sectional front-top view illustrating right zones of light along plane "8-8" in FIG. 6.
Figure 6:
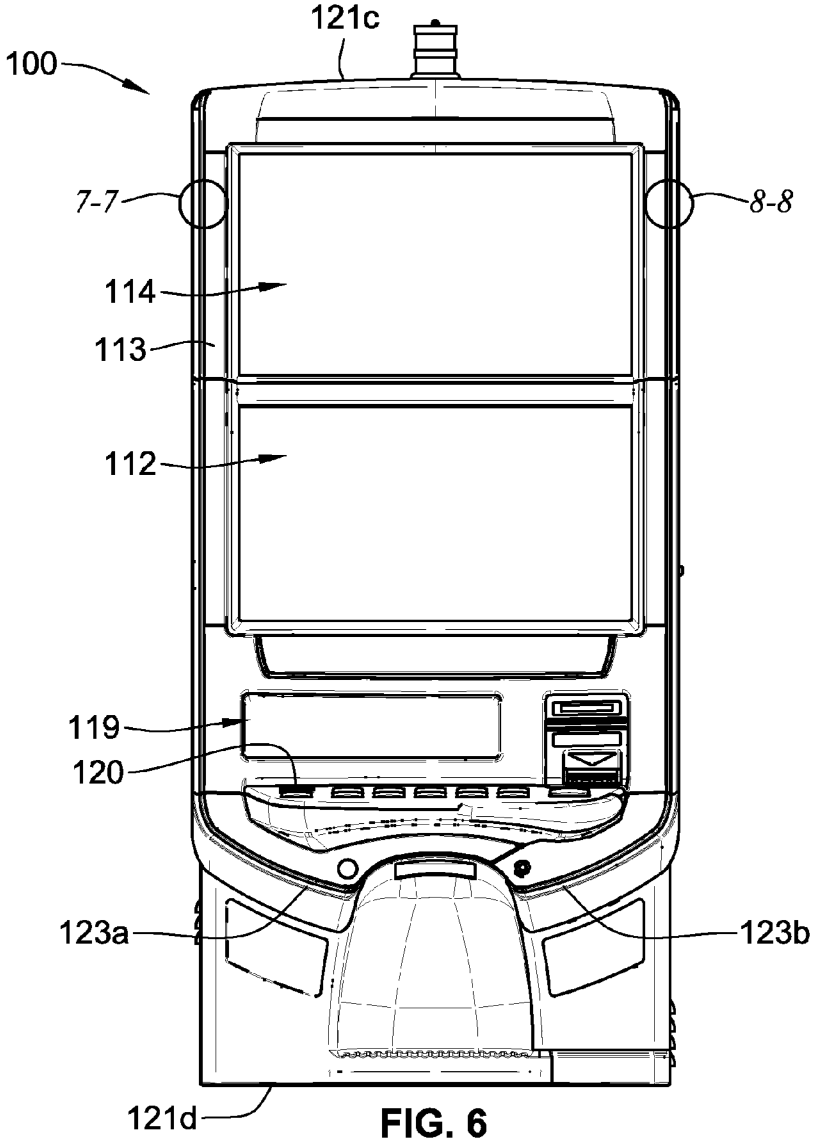
FIG. 6 is a front view of the gaming machine illustrated in FIG. 4.

Referring to FIGS. 6-8, the gaming machine 100 includes two primary zones of light—a left primary zone of light 125*a* and a right primary zone of light 125*b*. As viewable from the player position 115, the primary zones of light 125*a*, 125*b* are positioned, respectively, proximate and parallel to the exterior edges 121*a*, 121*b*. The primary zones of light 125*a*, 125*b* extend between the top exterior edge 121*c* and an interior side of the front edges 123*a*, 123*b*. As explained in more detail below in reference to FIG. 7, the primary zones of light 125*a*, 125*b* form a contour of bright light around the display areas 112, 114 (and their respective edges) and the interface area 119 to provide an enhanced gaming experience for the player.

The gaming machine 100 further includes two secondary zones of light—a left secondary zone of light 127*a* and a right secondary zone of light 127*b*. As viewable from the player position 115, the secondary zones of light 127*a*, 127*b* are positioned, respectively, parallel to and between respective ones of the primary zones 125*a*, 125*b* and exterior edges 121*a*, 121*b*. Similar to the primary zones of light 125*a*, 125*b*, the secondary zones extend between the top exterior edge 121*c* and the interior side of the front edges 132*a*, 123*b*. In contrast to the bright light provided by the primary zones 125*a*, 125*b*, the secondary zones of light 127*a*, 127*b* form a contour of dimmed light around the display areas 112, 114 and the interface area 119. As such, the visual contrast between the bright light of the primary zones 125*a*, 125*b* and the dimmed light of the secondary zones 127*a*, 127*b* further enhance the gaming experience for the player.

Optionally, in other examples, the gaming machine 100 can include other configurations of light zones. For example, in one alternative configuration the lighting of the zones of light 125, 127 is reversed, e.g., the primary zone of light 125 emits dimmer light and the secondary zone of light emits brighter light. In another example, the primary zone of light 125 is positioned between a respective exterior edge 121*a*, 121*b* and the secondary zone of light 127. In yet another example, additional zones of light are provided parallel to the existing zones of light 125, 127. In yet other examples, the zones of light 125, 127 can be configured to extend only in part between the top exterior edge 121*c* and the front edges 123*a*, 123*b*.

Figure 9:
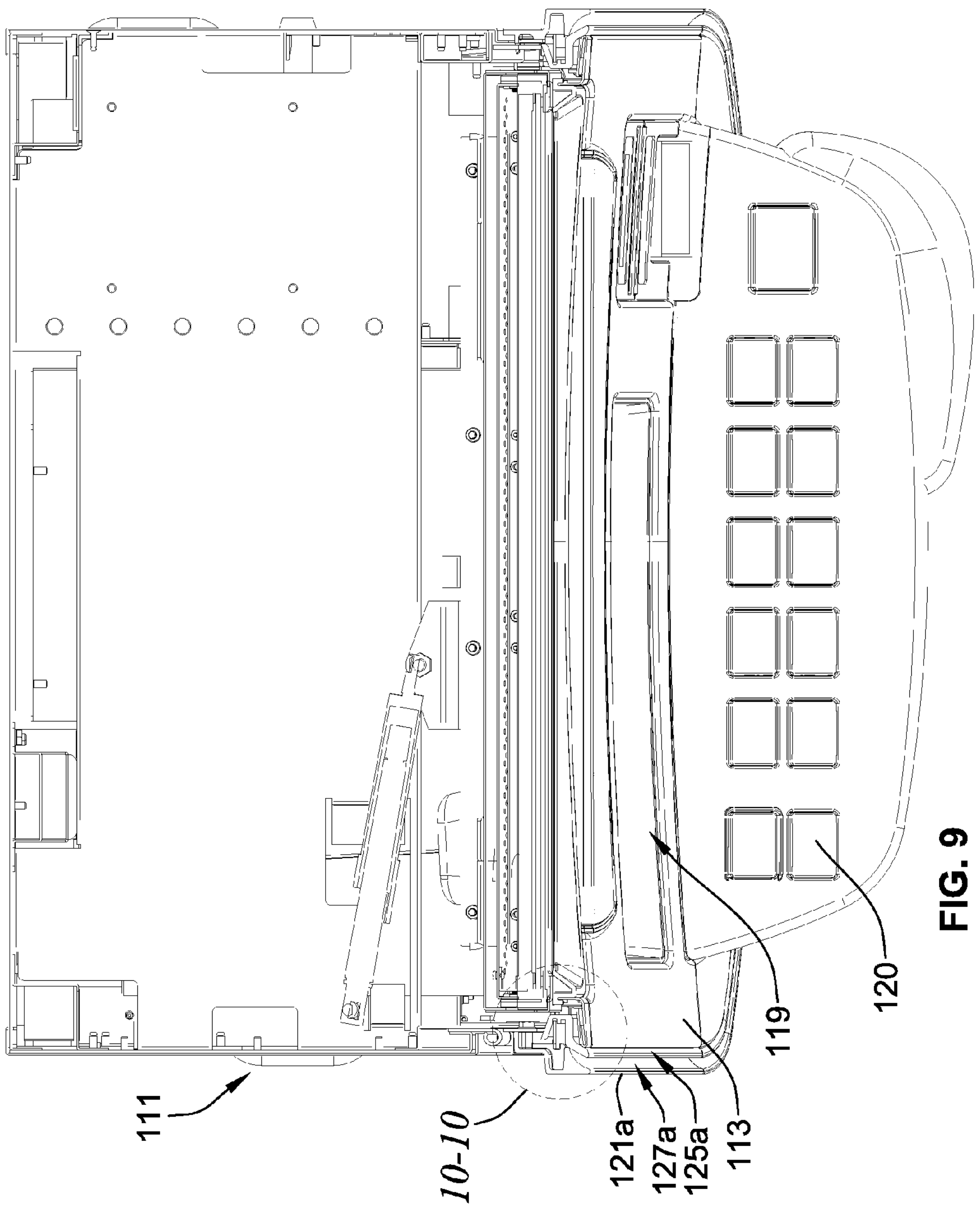
FIG. 9 is a top cross-sectional view along plane "9-9" in FIG. 4.
Figure 10:
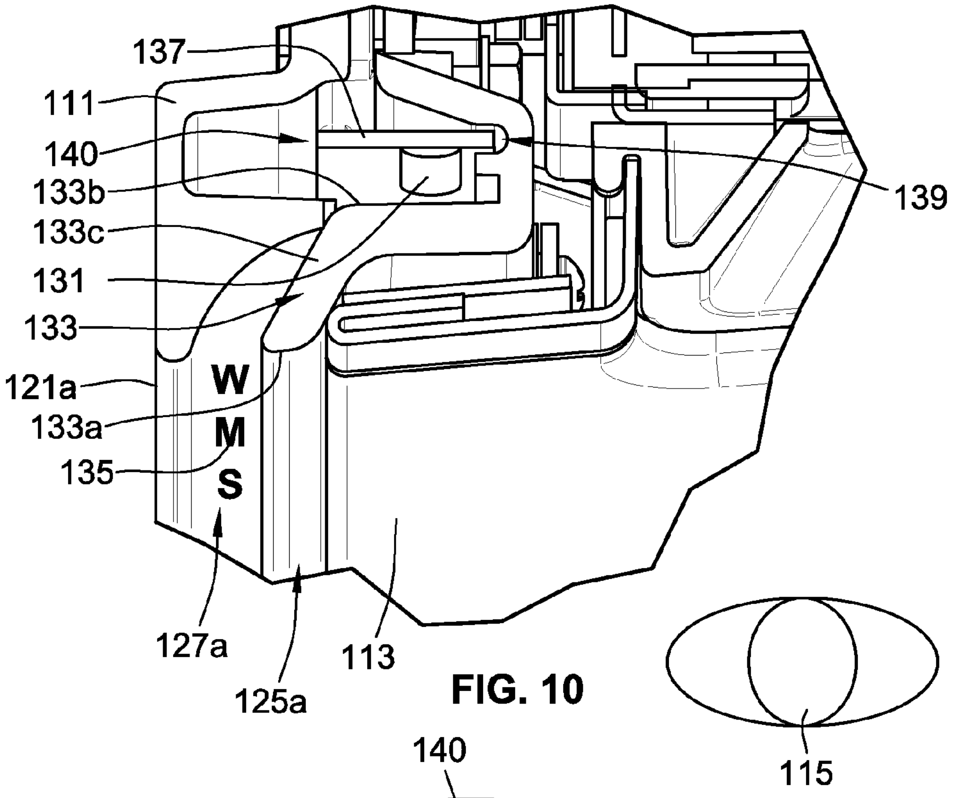
FIG. 10 is an enlarged view illustrating left zones of light in detail "10-10" of FIG. 9.
Figure 11:
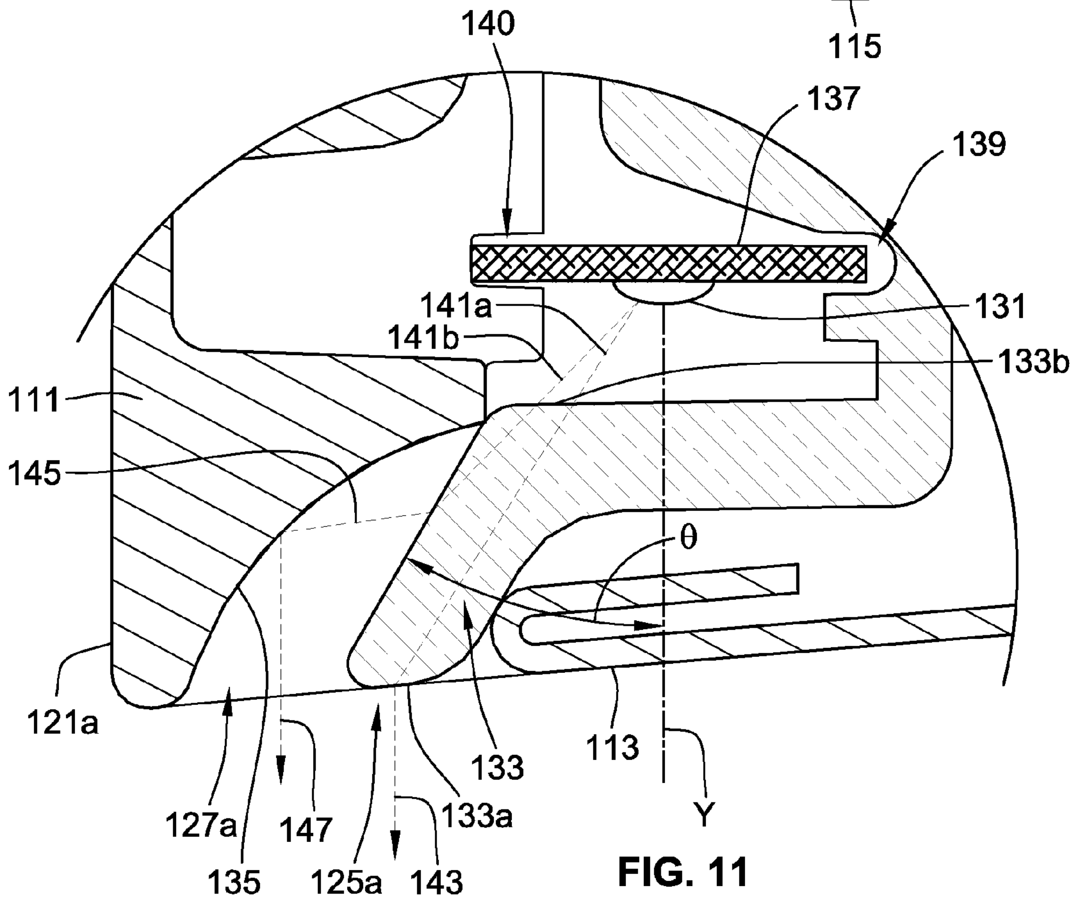
FIG. 11 is an illustration representative of the reflection of light in the zones of light shown in FIG. 10.

Referring to FIGS. 9-11, the emotive lighting feature includes a plurality of components, including a light source 131, a light pipe 133, and a reflective surface 135 (FIGS. 10 and 11). For ease of understanding, reference will be made to the left primary and secondary zones of light 125*a*, 127*a*. However, it is understood that the description is applicable to the right primary and secondary zones of light 125*b*, 127*b*, as well as to any other configuration of light zones.

The light source 131 is concealed within the cabinet frame 113 such that the light source 131 is not viewable from the player position 115. The concealment of the light source 131 is achieved in part by the shape and position of the light pipe 133, which obscures viewing of the light source 131 at least from some viewing angles outside the cabinet 111. According to one example, the light source 131 includes one or more light-emitting diodes (LEDs) that are mounted on a printed circuit board (PCB) 137. The PCB is inserted into receiving slots 139, 140 that are internally located within the cabinet frame 113.

The light pipe 133 has a proximal end 133*a*, a distal end 133*b*, and a pipe section 133*c* extending therebetween. The distal end 133*b* is positioned adjacent to the light source 131 and the proximal end 133*a* is positioned along a front surface 113*a* of the cabinet frame 113 and is directly viewable from the player position 115.

The pipe section 133*c* is slanted at an angle θ relative to an axis Y that is perpendicular to the cabinet frame 113. According to one example, the angle θ is in the range of about 60 degrees to 70 degrees. The angle θ helpful in achieving a parallel configuration between the primary and secondary zones 125*a*, 127*a*. As such, the reflective surface 135 and the proximal end 133*a* of the light pipe 133 are parallel to each other when viewed from the player position 115. Furthermore, the angle θ is helpful in minimizing seams in the cabinet such as by filling-in a gap between the reflective surface 135 (on the left side) and an adjacent front fascia of the cabinet frame 113 (on the right side).

The light pipe 133 includes an acrylic material having diffusing particles, which are helpful in providing a "softer" lighting ambience, e.g., lighting with no light glare and/or hot spots. For example, the acrylic material can be in the form of a sheet, rod, or tube as manufactured by Evonik Industries in the form of ACRYLITE® products. The ACRYLITE® products include products having a clear surface, a frosted surface, pigment formulation yielding 10-19% light transmittance, even distribution of light across an entire surface, etc.

The reflective surface 135 includes a chrome material that is helpful in providing a further diffusing effect on any light received and reflected towards the player position 115. The reflective surface 135 is a band-shaped (or strip-shaped) surface viewable by a player in front of the cabinet 111. Optionally, the chrome material is textured to include a pattern or background indicia. For example, a manufacturer trademark and/or brand (e.g., "WMS") or a Casino-specific logo can be included in the textured pattern or indicia.

The reflective surface 135 is adjacent the proximal end 133*a* of the light pipe 133 along the cabinet frame 113 and is contoured such that it has a concave curvature relative to the light pipe 133. The concave curvature and/or the chrome material are helpful in achieving a gentle glow of light, with a gentle gradation of light, for the secondary light zone 127.

Referring specifically to FIG. 11, the light source 131 emits initial light 141*a*, 141*b* that enters through the distal end 133*b* of the light pipe 133 and travels through the pipe section 133*c*. The pipe section 133*c* directs the initial light 141*a*, 141*b* from the distal end to the proximal end 133*a* such that (a) some of the initial light 141*a*, 141*b* exits the proximal end 133*a* as direct light 143 viewable from the player position 115 and (b) some of the initial light 141*a*, 141*b* exits the pipe section 133*c* as washed light 145.

The reflective surface 135 receives the washed light 145 from the pipe section 133*c* and reflects at least some of the washed light 145 as indirect light 147 viewable from the player position 115. The direct light 143 and the indirect light 147 essentially form the zones of light 125, 127 on the gaming machine 100. Thus, a player from the player position 115 will view two different types of light along the exterior edges 121*a*, 121*b* of the gaming machine—(a) a brighter direct) light 145 forming the primary zone of light 125 and (b) a dimmed (indirect) light 147 forming the secondary zone of light 127.

Each of these embodiments and obvious variations thereof is contemplated as falling within the spirit and scope of the claimed invention, which is set forth in the following claims.

What is claimed is:

1. A gaming machine comprising:

a cabinet including a cabinet frame facing a player position in front of the gaming machine;

one or more display devices within the cabinet frame and configured to display a wagering game;

at least one light source concealed within the cabinet such that the light source is not viewable from the player position, the light source emitting initial light;

at least one light pipe having a proximal end, a distal end, and a pipe section extending therebetween, the distal end being adjacent to the light source, the proximal end being positioned along the cabinet frame and directly viewable from the player position, the light pipe directing the initial light from the distal end to the proximal end such that (a) some of the initial light exits the proximal end as direct light viewable from the player position and (b) some of the initial light exits the pipe section as washed light; and at least one contoured reflective surface adjacent to the proximal end along the cabinet frame, the reflective surface being configured to receive the washed light from the pipe section and reflect at least some of the washed light as indirect light viewable from the player position.

2. The gaming machine of claim 1, wherein the at least one light source includes one or more light-emitting diodes (LEDs).

3. The gaming machine of claim 2, wherein the LEDs are mounted on a printed circuit board (PCB), the PCB being inserted into receiving slots internally located within the cabinet frame.

4. The gaming machine of claim 1, wherein the direct light is brighter than the indirect light.

5. The gaming machine of claim 1, wherein the pipe section is slanted at an angle θ relative to an axis Y that is perpendicular to the cabinet frame.

6. The gaming machine of claim 5, wherein the angle θ is in the range of about 60 degrees to 70 degrees.

7. The gaming machine of claim 1, wherein the light pipe is composed of an acrylic material having diffusing particles.

8. The gaming machine of claim 1, wherein the reflective surface includes a textured chrome material.

9. The gaming machine of claim 1, wherein the reflective surface includes a concave curvature relative to the light pipe.

10. The gaming machine of claim 1, wherein the light pipe and the reflective surface extend along an exterior vertical edge of the cabinet, the light pipe forming a primary zone of light proximate the edge of the at least one of the one or more display devices, the reflective surface forming a secondary zone of light parallel to the primary zone.

11. The gaming machine of claim 1, wherein the reflective surface and the proximal end are parallel to each other when viewed from the player position.

12. A gaming machine comprising:

a cabinet frame having at least one exterior edge viewable from and facing a player position in front of the gaming machine;

one or more display devices within the cabinet and configured to display a wagering game;

at least one light source concealed within the cabinet frame such that the light source is not viewable from the player position, the light source emitting initial light;

at least one primary zone of light positioned proximate and parallel to the exterior edge, the primary zone of light being defined by at least one light pipe having a proximal end, a distal end, and a pipe section extending therebetween, the distal end being adjacent to the light source, the proximal end being positioned along the exterior edge and directly viewable from the player position, the light pipe directing the initial light from the distal end to the proximal end such that (a) some of the initial light exits the proximal end as direct light viewable from the player position and (b) some of the initial light exits the pipe section as washed light; and at least one secondary zone of light positioned parallel to and between the primary zone of light and the exterior edge, the secondary zone of light being defined by a contoured reflective surface adjacent to the proximal end of the light pipe, the contoured reflective surface being configured to receive washed light from the pipe section and reflect at least some of the washed light as indirect light viewable from the player position.

13. The gaming machine of claim 12, wherein the direct light is brighter than the indirect light.

14. The gaming machine of claim 12, wherein the pipe section is slanted at an angle θ relative to an axis Y that is perpendicular to the cabinet frame.

15. The gaming machine of claim 14, wherein the angle θ is in the range of about 60 degrees to 70 degrees.

16. The gaming machine of claim 12, wherein the reflective surface includes a concave curvature relative to the light pipe.

17. The gaming machine of claim 12, wherein the at least one exterior edge includes a left exterior edge and a right exterior edge, wherein the at least one primary zone includes a first primary zone along the left exterior edge of the cabinet frame and a second primary zone along the right exterior edge of the cabinet frame, the at least one secondary zone including a first secondary zone associated with the first primary zone and a second secondary zone associated with the second primary zone.

18. A gaming machine comprising:

a cabinet including a band-shaped reflective surface viewable by a player in front of the cabinet; and a light pipe including a proximal end, the proximal end being parallel and adjacent to the reflective surface and viewable by the player, the light pipe positioned to receive light from a light source within the cabinet and emit a first portion of the light through the proximal end and a second portion of the light onto the reflective surface, the proximal end of the light pipe being separated by a gap from the reflective surface such that the second portion of the light travels through an air medium between the light pipe and the reflective surface.

19. The gaming machine of claim 18, wherein the light pipe and the reflective surface extend along an exterior vertical edge of the cabinet, the light pipe forming a primary zone of light proximate an edge of a display device housed within the cabinet, the reflective surface forming a secondary zone of light parallel to the primary zone.

20. The gaming machine of claim 18, wherein the light pipe is composed of an acrylic material having diffusing particles.

* * * * *